United States Patent [19]

Impullitti, deceased

[11] E Re. 28,469

[45] Reissued July 8, 1975

[54] DRY CLEANING PROCESS

[75] Inventor: Ector P. Impullitti, deceased, late of Detroit, Mich., by Madeline Impullitti, administratrix

[73] Assignee: F. W. Means & Company, Chicago, Ill.

[22] Filed: Apr. 27, 1973

[21] Appl. No.: 355,107

Related U.S. Patent Documents

Reissue of:

[64] Patent No.: 3,577,215
Issued: May 4, 1971
Appl. No.: 796,069
Filed: Feb. 3, 1969

[52] U.S. Cl. ..... 8/142; 8/137; 8/139; 8/139.1; 8/141; 252/88

[51] Int. Cl. ..... D06l 1/02

[58] Field of Search ..... 8/139.1, 141, 142, 137; 252/88

[56] References Cited

UNITED STATES PATENTS

| | | | |
|---|---|---|---|
| 2,047,448 | 7/1936 | Wilbur | 8/141 |
| 2,055,938 | 9/1936 | McKeon | 8/141 |
| 2,090,260 | 8/1937 | McNamara et al. | 8/141 |
| 2,607,786 | 8/1952 | Derby | 8/141 X |
| 2,692,861 | 10/1954 | Weeks | 252/88 |
| 2,974,339 | 3/1961 | Keydel | 252/88 X |
| 3,391,079 | 7/1968 | Greenblatt | 252/88 X |
| 3,493,320 | 3/1970 | Case et al. | 8/139.1 |
| 3,746,508 | 7/1973 | Landon | 8/141 |

*Primary Examiner*—Leland A. Sebastian
*Attorney, Agent, or Firm*—G. L. Church; Donald R. Johnson

[57] ABSTRACT

Oil impregnated textile cleaning utensils can be cleaned and prepared for reuse in a single brief operation by using a petroleum mineral oil as the cleaning medium. The utensils are cleaned by placing them into the wheel of a commercial dry cleaning apparatus then adding an excess of oil beyond that necessary to saturate the utensils at a temperature between 60–250°F. and agitating the wheel for about 15 minutes. The oil is drained off and the utensils are spun to remove excess oil but leave about 20 to 40 wt. percent oil in the utensil based on the weight of the clean, dry utensil or implement.

8 Claims, 3 Drawing Figures

Figure 1:
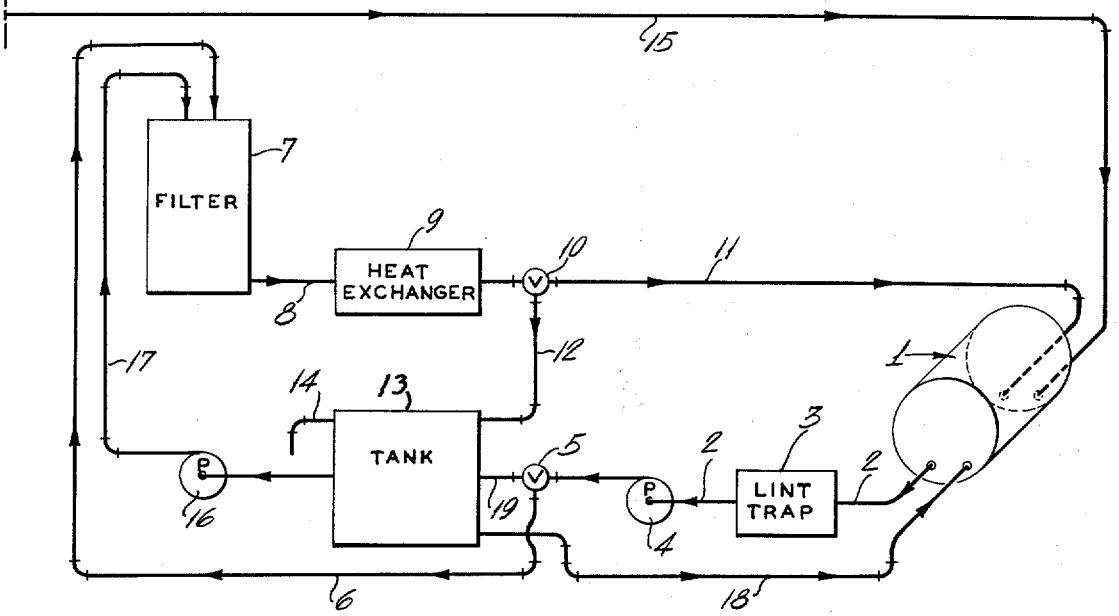

INVENTOR:
ECTOR P. IMPULLITTI
BY Kenneth H. Johnson
ATTY.

DRY CLEANING PROCESS

Matter enclosed in heavy brackets [ ] appears in the original patent but forms no part of this reissue specification; matter printed in italics indicates the additions made by reissue.

---

The present invention relates to the cleaning and preparation for reuse of oil impregnated textile cleaning utensils. More particularly, it relates to oil impregnated dust mops and cleaning cloths.

The trend today in industrial housekeeping is the use of rented or leased equipment, the project being that the supplier of this equipment is responsible for its maintenance, upkeep and cleaning. It has been demonstrated that stores, factories, hospitals, office buildings and other industrial or commercial establishments can be kept cleaner by simple dusting of the walls, floors, light fixtures and the like with oil impregnated cloths or rags and mops. The principal reason for the rapid acceptance of oil impregnated utensils is that they eliminate the need for water washing and cleaning. Water washing leaves a film on the floor or other surface unless *it* is wiped dry. This film presents a dull appearance to the surface and also can be a means for the spreading of infection whereas an oil impregnated cloth or mop will not leave this film. Another reason for the growth in the use of oil impregnated rags and mops is their ability to pick up dust lint and dirt and retain it. Thus, in a cleaning operation the dirt is picked up and removed, not merely moved above as is often the case in water washing.

The industrial concerns which rent or lease these oil impregnated utensils supply clean utensils to the user and pick up the dirty or used utensil which must be cleaned for reuse. In the past, the oil impregnated utensils have required a great deal of time and effort in their cleaning as well as the cost of oil reimpregnation of the utensil after it is cleaned. Briefly, the general procedure followed for cleaning the oil impregnated utensils has been first to boil the dirty utensils in a very strong alkali-detergent solution for approximately 1 to 2 hours. At this time, the oil which the mops contain is removed along with dirt. The excess water is removed usually by spin drying. Then the cleaning utensils are dried, which takes approximately 1 to 2 hours. From the dryer, the mops are treated to put back the oil that has been removed in the cleaning process. The entire operation has taken between 2 and 4 hours and has required as many as 12 people using several pieces of equipment and consuming vast quantities of heat, power and soft water. In addition, the water contaminated with the oil removed from the mop must now be disposed of, usually into the city sewage system where the cleaning facility is located.

I propose as my invention a process which will have as its principal objects, reduction in the time, effort and cost of cleaning and refurbishing used oil impregnated utensils, and elimination of water washing and the related problem of disposal of the oil contaminated wash water. These and other objects which will become apparent from the following description are achieved by the present invention.

Briefly stated the present invention is a process for cleaning soiled textile articles comprising contacting the soiled articles with a petroleum mineral oil, agitating the oil and removing the excess oil from the cleaned articles. More particularly the present invention is a process for cleaning soiled, oil impregnated textile cleaning utensils comprising contacting the soiled cleaning utensil with a petroleum mineral oil, agitating the oil and removing the excess oil from the cleaned oil impregnated utensil.

The term textile is used herein in its broadest sense, i.e., cloth, yarn fiber or fabric made from natural materials such as cotton, linen, wool, flax, hemp, and from synthetic materials such as nylon, rayon, poly(ethyleneterephthalate) which is woven, unwoven, knitted, matted, braided or the like.

Surprisingly the use of petroleum mineral oil in place of water results in a shorter process of only a few minutes, compared to the several hours required by the prior process.

I have found that a number of different oils may be used in the cleaning process. The oils may be light or heavy but the lighter oils are more suitable. The oils may be naphthenic, paraffinic or aromatic in character (this method of classifying oils is described in Analytical Chemistry, volume 30, 1224 (1958), and Industrial and Engineering Chemistry, volume 48, 2232 (1956). By the term "naphthenic" I mean oils containing substantial amounts of carbon atoms in naphthenic rings—$C_n$, i.e., 30 to 45 percent naphthenic carbon atoms and a viscosity-gravity constant ranging from 0.85 to 0.90. By the term "paraffinic" I mean oils containing substantial amounts of carbon atoms in paraffin chains —$C_p$, i.e., 50 to 70 percent paraffin carbon atoms and a viscosity gravity constant ranging from 0.79 to 0.84. By the term "aromatic" I mean oils containing substantial amounts of carbon atoms in aromatic rings—$C_a$, i.e. 30 to 60 percent aromatic carbon atoms and a viscosity-gravity constant ranging from 0.91 to 1.05. Generally, the oils will have a viscosity ranging from 38 to 60 Saybolt Universal seconds at 210°F. and 100 to 800 Saybolt Universal seconds at [ 210°F. and 100 to 800 Saybolt Universal seconds at ] 100°F. Mixtures of the above oils may be used.

Viscosity-gravity constant is a function of the composition of the oil. It increases as the number of aromatic or naphthene rings increase and can thus be used as a measure of the aromaticity of the oil. The formula for computing VGC is $$VGC = \frac{G-0.24-0.022 \text{ LOG } (V_t-34.5)}{0.755}$$

where G=specific gravity at 60°F. and V=Saybolt Universal viscosity at 210°F. (see *Hill* [ Mill ] et al Industrial Engineering Chemistry, volume 20, 641 (1928).

The color of the oils *is* [ in ] not critical, however, as in any cleaning process it is desirable that the oil be as light in color as possible. The particular method of preparing the oil is not of importance to the instant process. The oils can be produced by distillation, solvent extraction, acid treatment, hydrocracking, hydrotreating, hydrofining and other pertinent procedures such as silica gel treatment, clay treatment and the like. In addition to the oils per se, functional additives can be added to the oils which may enhance the operation of the process for example antioxidants, UV stabilizers, deodorants, oil soluble detergents, wetting agents, emulsifiers, bactericides, biostats, fungicides and the like. Generally 20 to 40 wt. percent oil based on the weight of the utensil will be retained in the utensil, preferably 28 to 32 wt. percent oil.

In the cleaning process of the invention the oil is employed in a quantity sufficient to thoroughly saturate the article to be cleaned and to provide an excess of oil into which the material removed in cleaning is either dissolved or suspended.

The drawing shows a diagrammatic representation of a cyclic system employing the present invention. The invention may be best understood by reference to the drawing and the following description.

The oil impregnated articles to be cleaned, for example, oil impregnated mops are loaded into a suitable container for agitation with the oil. In this case, the mops are loaded into the wheel portion of a 120 pound commercial dry cleaning laundry unit, 100 pounds of soiled mops were placed into wheel 1 of the dry cleaning unit and 100 gallons of oil at approximately 180°F. were charged through line 18 into wheel 1. In one embodiment the mops and oil are agitated together for approximately 20 minutes, during the agitation the oil is circulated via line 2 from wheel 1 through lint trap 3 by pump 4 to filter 7 through valve 5 and line 6. It then flows through heat exchanger 9 via line 8 hence back to wheel 1 through valve 10 and line 11. When the cleaning process is completed the oil is pumped from wheel 1 via line 2 and pump 4 to tank 13 through valve 5 and line 19. Make-up oil can be added to the system via line 15. The spin cycle time is approximately 10 to 14 minutes resulting in 20 to 40 wt. percent oil retention based on the clean, dry weight of the mops.

During the non-process time, to maintain a consistent oil condition, the filter 7 automatically eliminates the filter medium (not shown) and soil and regenerates the filter medium after which the oil is again circulated from tank 13 to filter 7 via line 17 and pump 16 hence back to tank 13 through line 8, heat exchanger 9, valve 10 and line 12. Overflow protection for tank 13 is provided through line 14 to a holding tank (not shown). Thus, during the entire cleaning operation the dirtied oil is continuously removed, cleaned, made up if necessary, heated and fed back to the cleaning operation.

In another embodiment substantially the same procedure was followed, however, 50 gallons of oil were added to wheel 1 and the mops and oil agitated together for approximately 20 minutes without circulation of the oil through the cleanup system. After the completion of the agitation the oil was pumped from wheel 1 by pump 4 through line 2, valve 5 and line 19 to tank 13 hence through the cleanup system as heretofore described. The mops in wheel 1 were subjected to a spin cycle, approximately 8–10 minutes, to leave about 4.8 ounces of oil in a one pound mop.

The temperature of operation is preferably between about 60 and 250°F. A particularly useful temperature range is about 150 to 200°F. Selection of the proper temperature is dependent to a certain extent upon the material being cleaned and the degree of soiling involved. The length of the cleaning cycle is in turn related to the degree of soiling, the temperature of the oil employed, the viscosity of the oil at the temperature employed and the degree or amount of agitation. Generally a more viscous oil will require a longer cycle in order to obtain the requisite degree of contacting, however, this can be somewhat overcome by the use of a higher temperature which will not only reduce the viscosity of the oil but will aid in the cleaning function of the oil in regard to the dirt entrained on the utensil.

Agitation is employed in order to obtain the maximum contact of the oil with the soiled utensil being cleaned. The amount of agitation employed is that sufficient to remove the entrained dirt from the soiled utensil. Either a rotary or rocking motion may be employed. Generally approximately 10 to 100 rotations per minute will be employed or in a case of rocking motion an equivalent number of partial rotations.

Figure 2:
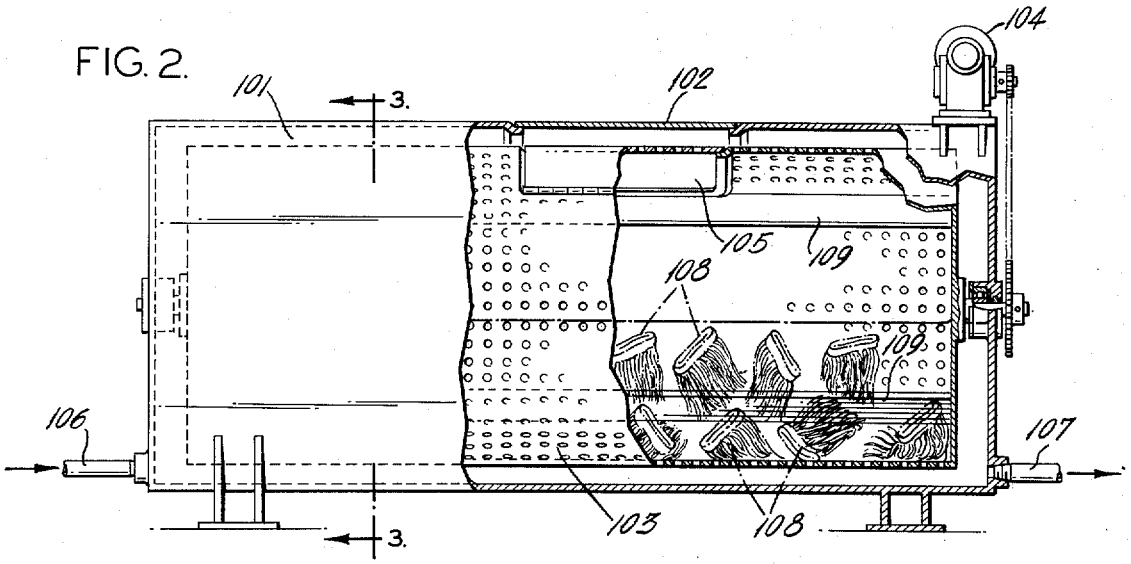
Figure 3:
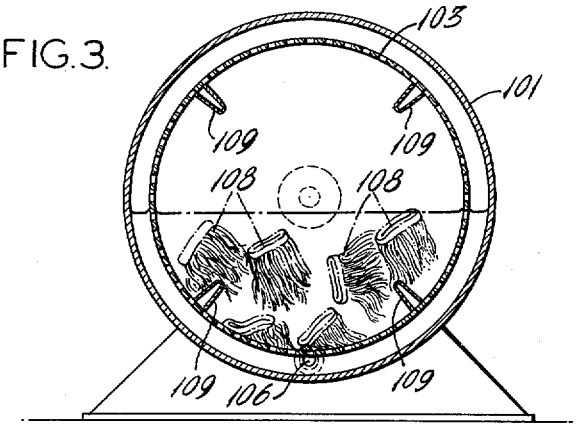

The *conventional* [ convention ] dry cleaning-washing apparatus described in FIG. 1 generally has a structure as shown in FIG. 2. An inner wheel 103 is disposed in an outer cylinder 101 so as to be rotatable about its long axis. Wheel 103 contains perforations over its entire surface to allow the free passage of the cleaning solution, oil in this case into the contact with the articles 108 which are to be cleaned. Cylinder 101 contains an opening with a door 102 through which the articles 108 to be cleaned are placed, hence, through an adjacent opening in wheel 103 which as a closure 105. The *oil* [ oils ] is added to the cylinder through conduit 106 and is removed through conduit 107 after the cleaning operation. The cleaning operation is carried out by either rotating or rocking the rotatably mounted wheel by means of a source such as an electric motor 104. FIG. 3 shows a cross section taken from FIG. 2 which shows that the internal surface of the wheel 103 can contain vanes or other protrusions 109 which will increase the degree of agitation and contact of the articles being cleaned with the cleaning oil.

In the description of a cyclic process employing the present invention relating the FIG. 1, the means of cleaning the used oil shown to be a filtration through a lint trap into a filtering tank 7 and *subsequently* [ subsequent ] into a tank 13. In the case of a batch process, a conventional lint trap is inadequate and becomes clogged thus a vibrating screen is used to remove the lint, however, in a continuous process the usual screen lint filter can be employed and requires no more maintenance than in a conventional dry cleaning process. A Har/Van Corporation filtration system has been employed and found suitable. The heart of this system is a series of rotating precoated screens through which the material to be filtered is passed. The solid particles are collected on the screens. In the next part of the filtering cycle, the filtered particles are removed from the screen and the screen recoated for the reuse. The precoating employed was 2 parts of a 20% clay, 80% *celite* [ celete ] mixture, 2 parts attapulgus and 1–2 parts carbon. It is to be understood that other methods of purifying the oil can be employed, for example, centrifuging the oil with continuous removal of the sludge from the centrifuge, also preparation of emulsions with small amounts of water into which the soil is dissolved and subsequent breaking of the emulsion and separation of the water and oil layers. Another method is electrostatic precipitation of the entrained dirt. Briefly, in this method 5 to 10 volume percent of water is added to the dirty oil and stirred in order to form a weak emulsion which when passed over a grid causes the water phase to coalesce thus breaking the emulsion. A variation of this method employs a non-uniform AC or DC field with the omission of the water. The dirt particles tend to migrate to the high field section and agglomerate. The agglomerated particles tend to fall from the oil solution. Alternatively no treatment at all need be employed. The oil can be cleaned quite adequately merely by placing it in a storage tank for 12 to 24 hours where the impurities will settle out.

In addition to cleaning articles that have residual oil left in the article, the instant process is suitable for cleaning cloth, textiles, fabrics and fibers both natural and synthetic for example, cotton, linen, wool, poly(ethyleneterephthalate) nylon and the like, which are not to have any residual oil. Subsequent to the oil cleaning process the article is *contacted* [ contracted ] with conventional dry cleaning solvents such as, naphtha, Stoddard solvent, carbon tetrachloride, gasoline, benzene, trichloroethane, perchloroethylene, toluene, and the like, to remove any traces of oil. These are essentially hydrocarbons and halogenated hydrocarbons particularly chlorinated hydrocarbons and mixtures thereof that boil principally in the range of 60 to 150°F. This has the advantage over prior conventional dry cleaning processes which usually require several separate cycles of cleaning with the conventional solvents, that at least one of the cleaning cycles is replaced with the oil cleaning process of the present invention. The lubricating properties of the oil employed in the present process reduces the wear on the fabrics, particularly the synthetics, thus extending the life of the article cleaned.

The following examples are presented to illustrate the operation of the present invention:

EXAMPLE 1

One-hundred pounds of dirty oil-impregnated mops were loaded into tub of a 120 pound Float-Air commercial dry cleaning laundry unit. Fifty gallons of naphthenic oil at a temperature of 180°F. was added to the wheel. The oil employed was a naphthenic oil[1] having the following properties:

| | |
|---|---|
| Viscosity, SUS at 100°F. | 115 |
| Viscosity, SUS at 210°F. | 41.0 |
| API gravity at 60°F. | 23.3 |
| Specific gravity at 60°F. | .9140 |
| Density 20/4 | .9103 |
| Flash point, COC, °F. | 335 |
| Pour point °F. | −30 |
| Color, ASTM D-1500 | .5 |
| UV absorptivity at 260 my | 3.0 |
| Molecular weight | 325 |
| Viscosity-gravity constant carbon type analysis | .873 |
| Aromatic carbon atoms, $C_A$, percent | 16 |
| Naphthenic carbon atoms, $C_N$, percent | 42 |
| Paraffinic carbon atoms, $C_P$, percent | 42 |

[1] Sunthene 415, Sun Oil Company

The wheel was rotated at approximately 40 revolutions per minute. This was continued for about 5 minutes. The oil was then drained from the wheel, while the wheel continued to rotate. After the oil was drained the spinning of the wheel was continued at about 100 r.p.m. for about 8 minutes which left about 4.8 ounces of oil in each pound of mops. The oil drained from the wheel had a temperature of about 160°F. The finished mops were clean and ready for use. No difference could be detected from water washed mops that had required about three hours to achieve the same condition. The oil was cleaned and available for reuse.

EXAMPLE 2

50 pounds of soiled mops and 100 gallons of oil were charged to the wheel and substantially the same procedure as in Example 1 was followed but dirty oil was continuously removed and clean oil continuously added at the same rate. The finished mops were indistinguishable from those of Example 1.

The invention claimed is:

1. A process for cleaning a soiled textile *cleaning* article comprising:

a. contacting the soiled article at a temperature in the range of about 60 to 250°F. with a petroleum mineral oil having [ a viscosity in the range of about 100 to 800 SUS at 100°F. and ] *lubricating viscosity and having viscosity-gravity constant in the range of about 0.79 to 1.05 substantially as sole cleaning agent* in an amount in excess of that necessary to saturate the article;

b. agitating the oil while in contact with said articles;

c. and removing the excess oil from the cleaned, oil-impregnated textile article.

2. The process according to claim 1 wherein the used contacting oil is continually removed and clean contacting oil is continually added.

3. The process according to claim 1 wherein said article after step (c) contains about 20 to 40 weight percent clean oil.

[ 4. The process according to claim 2 wherein the continually removed used contacting oil is continually cleaned and, after cleaning, continually recycled as clean contacting oil. ]

[ 5. The process according to claim 4 wherein the excess oil is removed by centrifugation. ]

[ 6. The process according to claim 5 wherein the used contacting oil is continually cleaned by at least one of the following: filtration, centrifugation, electrostatic precipitation and sedimentation. ]

7. The process according to claim [ 6 ] *1* wherein the oil impregnating the article after the excess oil has been removed is then removed by contacting with a solvent boiling in the range of 60 to 150°F. and selected from the group consisting of hydrocarbons, halogenated hydrocarbons and mixtures thereof.

[ 8. The process according to claim 6 wherein said article is a cleaning textile article. ]

9. The process according to claim [ 3 ] *1* wherein the cleaning article is a mop.

10. The process according to claim [ 3 ] *1* wherein the contacting temperature is in the range of about 150–200°F.

*11. The process according to claim 1 wherein the excess oil from step (c) is cleaned by filtration.*

*12. In a process for cleaning a soiled oil-impregnated textile cleaning article wherein the article is cleaned with a cleaning agent and treated with lubricating oil to put back the oil removed in the cleaning process, the improvement which consists essentially of:*

*a. contacting the soiled article in a cleaning zone at a temperature in the range of about 60° to 250°F with a petroleum mineral oil having lubricating viscosity and having viscosity-gravity constant in the range of about 0.79 to 1.05 substantially as sole cleaning and impregnating agent, in an amount in excess of that necessary to saturate the article;*

*b. agitating the oil with rotary or rocking motion while in contact with said articles;*

*c. removing the excess oil from the cleaned, oil-impregnated textile article by spinning the articles in said zone;*

*d. cleaning the removed used contacting oil;*

*e. and after cleaning, recycling the oil as clean contacting oil.*

* * * * *